261-93 SR Search
FIP7910 OR RE 19,965

May 12, 1936. E. SCHRÖDER ET AL Re. 19,965

Orig. 1,927,376

PROCESS AND APPARATUS FOR THE MECHANICAL PRODUCTION OF FROTH

Original Filed Feb. 3, 1930

INVENTORS

EINER SCHRÖDER

JAN A. S. VAN DEURS

By Emil Bönnelycke

ATTORNEY

261. GAS & LIQUID CONTACT
APPARATUS.
93

Search

Reissued May 12, 1936

Re. 19,965

UNITED STATES PATENT OFFICE 19,965

PROCESS AND APPARATUS FOR THE MECHANICAL PRODUCTION OF FROTH

Einer Schröder and Jan Arent Schoenheyder van Deurs, Frederiksburg, Denmark

Original No. 1,927,376, dated September 19, 1933, Serial No. 425,580, February 3, 1930. Application for reissue September 19, 1935, Serial No. 41,258. In Germany February 6, 1929

10 Claims. (Cl. 261—93)

The present invention relates to an improved process and apparatus for the mechanical production of froth by directing a liquid and a gas into a vessel where said substances are converted into froth by the relative motion of said substances and rotary or stationary mixing members.

In processes of this nature heretofore known, the formation of froth has been effected in two stages, viz. first by passing the gas through a filter which distributes the gas uniformly in the inflowing liquid, so that the formation of froth is instantly promoted, and then by causing the froth so formed to continue passing through the vessel, during which time it is exposed to the action of rotary stirring members, whereby the froth is broken up into smaller bubbles.

One disadvantage of such processes is that the quantity of froth produced per unit of time is limited, since the velocity of the stirring members must not be so high that separation of the heavy liquid from the light gas will be effected, as a result of which the liquid would collect along the inner periphery of the container, while the gas would escape.

In the apparatuses of the above mentioned nature already known, the froth is free to pass axially through the apparatus, that is to say, no members are provided for forcing the froth to pass through the apparatus in such manner, viz. alternately towards the axis and the periphery of the stirring apparatus, that thorough and efficient mixing is obtained. The froth necessarily partakes of the motion of the stirring members and becomes atomized by being broken up between the stirring members and stationary vanes provided on the inside of the mixing vessel. The effect thereby obtained, however, is not so efficient as might be desired.

According to a previously known process foam has been produced by causing gas or air to pass through a porous substance immersed in a solution of a foam generating liquid, but with this process the gas or air was not mixed so intimately with the said liquid that the foam produced did not include a considerable amount of liquid, requiring removal from the foam. Further the bubbles of the foam were not sufficiently fine to form a satisfactory foam.

Furthermore it has been proposed to produce foam by passing a gas and a foam generating liquid under pressure through a mixing body comprising inner cavities, for instance pores or annular channels, by which the gas and liquid is caused to form a considerable number of fine streams impinging against and intersecting each other within the said body, thereby causing eddies or whirling motions, for securing intimate mixture of the said gas and liquid.

A mixing body having the character of a porous body offers a considerable resistance to the penetration of the gas and liquid and is also liable to become non-porous. Therefore such mixing bodies are not applicable if the rapid and continuous production of a considerable amount of foam is required. A mixing body comprising annular cavities or channels of considerable width in which eddies or whirling motions of the gas and liquid are produced is not able to secure a sufficiently fine subdivision of the constituents and a homogeneous and stable foam.

The present invention has for its object to obtain the very efficient formation of froth by whipping gas into liquid, the froth produced being far more stable than the froth heretofore produced by mechanical means. The main object of the invention is, in other words, to produce a froth in which the gas and the liquid are so intensively mixed that the froth practically consists merely of closely adjacent gas-filled bubbles separated by thin liquid films. In contradistinction to this the froth heretofore produced by mechanical means frequently consists in fact of gas bubbles immersed in a larger or smaller quantity of liquids, which consequently to a certain extent acquires a frothy character.

According to the present invention froth is mechanically produced by directing a gas and a froth forming liquid against stationary or rotary mixing members in a mixing apparatus under a pressure at least 0.5 atmosphere higher than atmospheric pressure. The mixing of the gas into the liquid may be effected by means of rotary members, for instance vanes, brushes, or the like, or, if motion is imparted to gas and liquid, by means of stationary members, such as wires, or wire gauze, by or through which the gas and liquid are passed at high speed. The distance between two adjacent wires may be considerably larger than the diameter of the bubbles of foam to be produced.

By carrying out the mixing of the gas into the liquid under a pressure which is one half to ten atmospheres higher than atmospheric pressure, more gas will be dissolved in the liquid than is otherwise possible, and the gas in the bubbles formed will be under a pressure exceeding that of the atmosphere and depending on the diameter of the bubbles and the surface tension of the liquid relatively to that of the gas. When the froth thus produced passes out into the atmosphere then the excess pressure will be equalized by expansion of the air in the bubbles, so that the walls of the bubbles become thinner and thereby obtain greater strength. At the same time the expansion of the bubbles results in an appreciable increase in the volume of the froth formed. The equalization of the excess pressure will also cause the formation of a multitude of fine froth bubbles filling out the interstices between the larger bubbles produced by the mixing, so that the froth becomes more stable than froth as heretofore formed by mixing gas into liquid.

The production of froth under pressure possesses the further advantage that the production of a certain quantity of froth per unit of time can be performed in an apparatus which is smaller than the apparatus in which heretofore a corresponding quantity of froth could be produced under ordinary atmospheric pressure.

The pressure on the liquid and gas to be whipped together in the mixing apparatus may be obtained by injecting the liquid and the gas into the apparatus either separately by means of a separate pump for each or, as far as the liquid is concerned, by means of an ejector, or by pumping liquid and gas into the mixing apparatus by means of one and the same pump, in which case a preliminary mixing may be effected in the pump itself. If a gear-wheel pump or piston pump is used or some other pump, which is able to pump a certain volume per unit of time independently of the counteracting head, then the liquid may be caused to flow so that it is pumped at such a velocity that any predetermined ratio of mixture between liquid and gas is obtained.

By way of example, in order to prepare a stable froth, the proportion in which air or other gas and froth-forming liquid are to be mixed, is ordinarily one part of liquid and nine parts of air, for instance when the froth-forming agent is saponin, and the apparatus may be so adjusted that this or any other desired predetermined ratio of mixture between the liquid and gas is obtained.

At the discharge end, or in the discharge passage of the mixing apparatus a suitable resistance is provided against the motion of the froth, for example, by means of a valve, or by using as the discharge passage a pipe or hose offering a suitable resistance to the motion of the froth. By this means it becomes practicable to adjust the pressure in the mixing apparatus to any suitable magnitude.

In order to more clearly describe the present invention reference will be made to the accompanying drawing in which.

Figure 1:
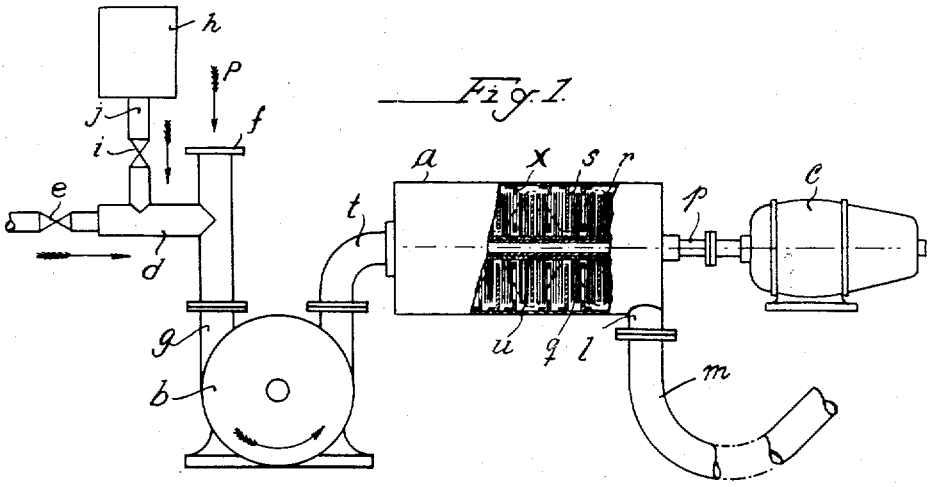
Fig. 1 is a diagrammatic side view of an apparatus shown partly in section and constructed according to the invention for the production of froth by the use of rotary mixing members.

In Fig. 1 *a* is a cylindrical vessel, in one end of which is journalled a shaft *p*, which is coupled to a motor *c*. On the shaft *p* is mounted a series of stirring members *q* consisting suitably of radially disposed brushes. Between the brushes are disposed a number of transverse walls *r* and *s*, which are perforated alternately at their outer peripheries, i. e. the walls *r* are perforated immediately adjacent the wall of the vessel *a* and the walls *s* at their centers.

*b* is a pump which is driven by a motor (not shown), which motor may be the same motor *c*, which drives the shaft *p*. The water flows to the pump *b* through a pipe *d*, and a foaming agent, located at the container *h*, is fed continuously and in small amounts to the pipe *d* through the pipe *j*, which is fitted with an adjustable valve *i*.

Air flows in the direction of the arrow *p* in Fig. 1 to the pump through the pipe *f*, in which the pipe *d* terminates. The pump *p* drives the air and liquid through a pipe *t* into the container *a*, in which the said liquid and air under the action of the pump *b* will be forced to pass sinuously through the vessel *a* along the dotted path *u* due to the different locations of the perforations in the walls *s* and *r*.

During the passage of the liquid and air through the vessel *a*, the rotary brushes *q* cause an intimate mixing of the air and liquid, so that the said two substances together form a dispersion under a pressure which depends upon the efficiency of the pump *b* and lies ordinarily between 1.5 and 11 atmospheres, so that the pressure in the vessel *a* would be 0.5 to 10 atmospheres higher than the atmospheric pressure.

The dispersion is discharged either directly in the atmosphere or preferably through a hose *m* of shorter or longer length, which hose terminates in an outlet nozzle *n*. In the vessel *a* stationary walls *x* are inserted alternately with the walls *r* and *s* and are fitted with slits through which the liquid and air flow during their passage through the vessel *a*. The walls *x* stop or impede rotary motion of the liquid.

Figure 2:
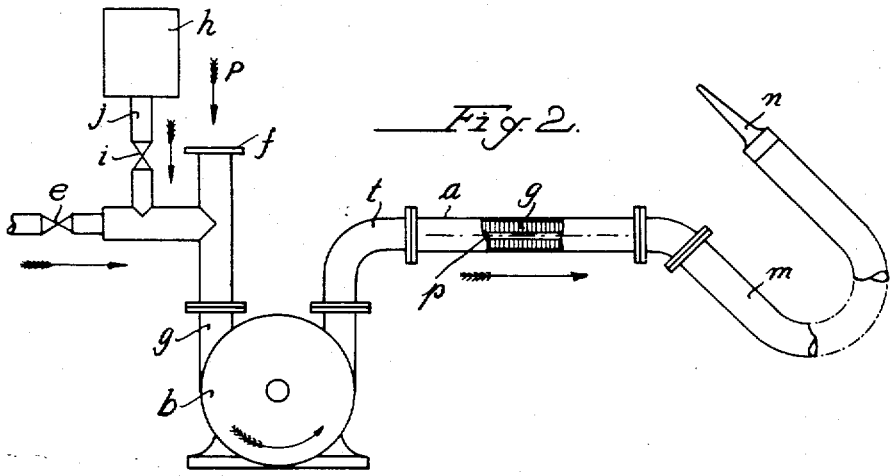
Fig. 2 is a diagrammatic side view of a modified apparatus according to the invention for the production of froth by the use of stationary mixing members and Figs. 3 and 4 are end views of two different arrangements of stationary mixing members.
Figure 3:
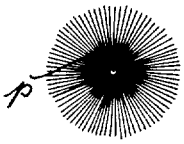
Figure 4:
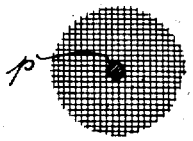

In the modification shown in Fig. 2 the vessel *a* is in the form of a pipe fitted with transversely disposed stationary wires *g*, Figs. 2 and 3, or networks, Figs. 2 and 4, which are perforated transversely from a centrally disposed shaft *p* on which the wires or networks are attached or supported in any suitable manner. The liquid and air are forced to pass through the said wire gauze or stationary wires, whereby an intimate mixing of the two constituents, air and water, to form a dispersion, is caused.

It should be noted that while we have, at the outset of this specification, referred to the production of froth in accordance with our invention by directing a liquid and a gas into a vessel where said substances are converted into froth by the relative motion of said substances and rotary or stationary mixing members, we do not mean to convey the idea that a true froth is produced in the mixing chamber of our apparatus. On the contrary, our invention distinguishes from all prior methods and apparatus for the mechanical production of froth by the formation in the mixing chamber of a dispersion of a gaseous fluid in a froth-forming liquid under a superatmospheric pressure, preferably one half to ten atmospheres higher than atmospheric pressure, all as already hereinabove referred to, whereby the resulting mixture or dispersion has substantially the characteristics of a liquid as distinguished from those of a froth.

Explained in somewhat different terminology, our invention contemplates the production of froth by feeding a liquid and a gas into a mixing chamber wherein said substances are converted under pressure into a mixture of bubbles of gas 261. GAS & LIQUID CONTACT APPARATUS.
93
Search and a liquid body; this mixture distinguishing from a true froth in that the dispersed gaseous phase of our mixture is carried in suspension within a substantially continuous free liquid phase or body, the term liquid being employed in the accepted sense in which it is commonly used; whereas a true froth comprises bubbles of gas bounded and contained within exceedingly thin walls or films of liquid with no free liquid medium interposed between the bubbles. In our invention, it is only when this mixture or dispersion has been permitted to expand and convert into a true froth that bubbles of gas are obtained which are surrounded only by thin walls or films of liquid.

This distinguishing feature of preparing a mixture or dispersion of a gas in a liquid under pressure is an important and basic one, because thereby the advantages of liquid discharge are secured, so that the resultant stream which is expelled from the discharge outlet has sufficient velocity to carry the froth to a relatively great distance, for example, depending upon the pressure employed, to a distance of one hundred feet or more. Such a velocity and range of discharge are not possible with previously known apparatus in which the froth itself is actually formed within the apparatus, because the coefficient of friction of froth is so much greater than that of the liquid and gas mixture or dispersion, which is characteristic of our invention, that the froth can only be discharged at low velocity and with a relatively small range.

It should be noted further that, while under the pressures contemplated by us in the apparatus of our invention more gas will be dissolved in the liquid than is otherwise possible, a great proportion of the gas remains undissolved in the form of highly compressed bubbles dispersed through the froth-forming liquid, thus forming the mixture or dispersion to which we have already referred.

Above it is assumed that the gas used for preparing the foam was air, but any other suitable fluid, for instance, carbon dioxide, may be used for the said purpose. The foaming agent contained in the vessel *h* is ordinarily a solution of saponine. The arrows in Figs. 1 and 2 indicate the directions in which the different constituents or mixture of constituents flow. An air-jet water pump (ejector) may be substituted for the pump *b* in Figs. 1 and 2, in which event a source of compressed air to be fed through the ejector is connected to the pipe *f*.

We claim:—

1. A method of mechanically producing froth, comprising feeding a fluid and a froth-forming liquid simultaneously through a mixing chamber, maintaining a superatmospheric pressure in the said chamber and forming therein a dispersion of the said fluid in the said liquid, and allowing the dispersion to expand and convert into froth in consequence of the discharge of the dispersion from said chamber.

2. A method of mechanically producing froth, comprising feeding a fluid and a froth-forming liquid simultaneously and continuously through a mixing chamber, maintaining in the said chamber a superatmospheric pressure and forming in the chamber a dispersion of said fluid in said liquid, and allowing the dispersion to expand gradually and convert into froth in consequence of the discharge of the dispersion from said chamber.

3. A method of mechanically producing froth, comprising feeding a fluid and a froth-forming liquid simultaneously through a mixing chamber in the mutual proportions of weight in which they would have to be present in stable foam at atmospheric pressure, forming in the said chamber at a superatmospheric pressure a dispersion of said fluid in said liquid, and allowing the dispersion to expand gradually and convert into froth in consequence of the discharge of the dispersion from said chamber.

4. A method of mechanically producing froth, comprising feeding fluid and a froth-forming liquid simultaneously and continuously through a mixing chamber, maintaining in the said chamber a pressure at least 0.5 atmosphere higher than the atmospheric pressure, forming in the said chamber a dispersion of the said fluid in said liquid, and allowing the dispersion to expand gradually and convert into froth in consequence of the discharge of the dispersion from said chamber through a hose.

5. An apparatus for mechanically producing foam, comprising a container, a plurality of stationary wires disposed transversely in the interior of the container, an inlet and an outlet on the container, and means for simultaneously supplying to the container through the said inlet a flow of fluid and a flow of a foaming liquid under a pressure at least 0.5 atmosphere higher than atmospheric pressure and for forcing the said fluid and liquid against and past the said wires on to the outlet, thereby causing the fluid to be dispersed in the liquid to form a dispersion which when discharged through the outlet expands and forms froth.

6. An apparatus for mechanically producing foam, comprising a container, a plurality of stationary wires disposed transversely in the interior of the container, an inlet and an outlet on the container, a discharge hose connected to said outlet, and means for simultaneously supplying to the container through the said inlet a flow of air and a flow of a foaming liquid under a pressure at least 0.5 atmosphere higher than the atmospheric pressure and for forcing the said liquid and air against and past the said wires out through said hose, thereby causing the air to be dispersed in the liquid to form a dispersion which when discharged through the hose expands and forms froth.

7. A method of mechanically producing froth, comprising feeding a gaseous fluid and a froth-forming liquid simultaneously through a mixing chamber, maintaining a superatmospheric pressure in said chamber and intimately mixing the gaseous fluid and the froth-forming liquid therein by mechanically subdividing the flow of the gaseous fluid and the liquid and causing them to move in a comparatively great number of relatively small streams, whereby a dispersion of said gaseous fluid in said liquid is formed in said chamber, and allowing the dispersion to expand and convert into froth in consequence of the discharge of the dispersion from said chamber.

8. A method of mechanically producing froth, comprising feeding a gaseous fluid and a froth-forming liquid simultaneously and continuously through a mixing chamber, maintaining in the said chamber a pressure at least 0.5 atmosphere higher than the atmospheric pressure and intimately mixing the gaseous fluid and the froth-forming liquid therein by mechanically subdividing the flow of gaseous fluid and the liquid and causing them to move in a comparatively great number of relatively small streams, whereby a dispersion of said gaseous fluid in said liquid is formed in said chamber, and allowing the dispersion to expand gradually and convert into froth in consequence of the discharge of the dispersion from said chamber through a hose.

9. A method of mechanically producing froth, comprising directing a gaseous fluid and a froth-forming liquid simultaneously into a mixing chamber, maintaining a superatmospheric pressure in said chamber and forming therein a mixture of the said gaseous fluid and the said liquid, wherein the dispersed gaseous medium is carried in suspension within a substantially continuous free liquid body, said mixture having substantially the characteristics of a liquid as distinguished from those of a froth, and allowing the mixture to expand and convert into froth in consequence of the discharge of the mixture from said chamber, said froth differentiating from said mixture in that the froth comprises bubbles of gas bounded and contained within exceedingly thin walls or films of liquid with substantially no free liquid medium interposed between the bubbles.

10. A method of mechanically producing froth, comprising directing a gaseous fluid and a froth-forming liquid simultaneously and continuously into a mixing chamber, maintaining in the said chamber a pressure at least 0.5 atmosphere higher than the atmospheric pressure and intimately mixing the gaseous fluid and the froth-forming liquid therein by mechanically subdividing the flow of the gaseous fluid and the liquid and causing them to move in a comparatively great number of relatively small streams, whereby a mixture of said gaseous fluid and said liquid is formed in said chamber, wherein the dispersed gaseous medium is carried in suspension within a substantially continuous free liquid body, said mixture having substantially the characteristics of a liquid as distinguished from those of a froth, and allowing the mixture to expand gradually and convert into froth in consequence of the discharge of the mixture from said chamber through a hose, said froth differentiating from said mixture in that the froth comprises bubbles of gas bounded and contained within exceedingly thin walls or films of liquid with substantially no free liquid medium interposed between the bubbles.

JAN ARENT SCHOENHEYDER VAN DEURS.
EINER SCHRÖDER.